United States Patent [19]
Boys et al.

[11] Patent Number: 5,875,448
[45] Date of Patent: Feb. 23, 1999

[54] DATA STREAM EDITING SYSTEM INCLUDING A HAND-HELD VOICE-EDITING APPARATUS HAVING A POSITION-FINDING ENUNCIATOR

[76] Inventors: Donald R. Boys, 2720 Tierra Way, Watsonville, Calif. 95076; Dan Kikinis, 20264 Ljepava Dr., Saratoga, Calif. 95070

[21] Appl. No.: 727,179

[22] Filed: Oct. 8, 1996

[51] Int. Cl.[6] .................................................. G06T 1/00
[52] U.S. Cl. ...................... 707/531; 704/201; 704/260; 704/235; 704/278; 345/302
[58] Field of Search ............................ 345/302; 707/501, 707/531; 704/270, 271, 277, 278, 260, 201, 235, 276; 381/121

[56] References Cited

U.S. PATENT DOCUMENTS

| | | | |
|---|---|---|---|
| 4,779,209 | 10/1988 | Stapleford et al. | 707/278 |
| 5,220,611 | 6/1993 | Nakamura et al. | 707/278 |
| 5,309,546 | 5/1994 | Baker et al. | 704/271 |
| 5,444,768 | 8/1995 | Lemaire et al. | 379/68 |
| 5,475,798 | 12/1995 | Handlos | 704/277 |
| 5,491,774 | 2/1996 | Norris et al. | 704/270 |
| 5,588,839 | 12/1996 | Shimoda | 434/114 |
| 5,640,590 | 6/1997 | Luther | 345/302 |

OTHER PUBLICATIONS

WordPerfect 6.1 for Windows for Dummies, IDG Books Worldwide, Inc., pp. 53–54, Jan. 1994.

Farallon, MacRecorder User's Guide, Farallon Computing, Inc., pp. 35–46, Jan. 1990.

*Primary Examiner*—Joseph H. Feild
*Attorney, Agent, or Firm*—Donald R. Boys

[57] ABSTRACT

An Audio Editor operates with files capable of storing text and voice data in separate regions, and provides functions for entering data as voice data, and also for fully editing the entered voice data. Files can be uploaded from the Audio Editor to a PC application for converting the file entirely to text, providing a system wherein all variable entry and editing can be done verbally, and conversion to text left as a final chore. In an alternative embodiment the Audio Editor is implemented as a PC application wherein a user can enter and fully edit variable input as voice, and then communicate the resulting file to another for final conversion. In yet another embodiment the Audio Editor is implemented as additional functionality to a high-end word processor application. In further embodiments computerized natural data editors are provided for reviewing and editing natural data streams of all sorts, such as video streams, musical works, and the like.

18 Claims, 6 Drawing Sheets

DATA STREAM EDITING SYSTEM INCLUDING A HAND-HELD VOICE-EDITING APPARATUS HAVING A POSITION-FINDING ENUNCIATOR

FIELD OF THE INVENTION

The present invention is in the field of systems for recording and editing natural data information and pertains in a preferred embodiment to a system allowing a user to rapidly and effectively edit voice-recorded information before transcription.

BACKGROUND OF THE INVENTION

The present period of history has been termed by many the information age. Every business and nearly every field of human activity is involved with references, instructions, briefs, periodicals, articles, books, electronic files, video files, and the like. In the area of electronic files, the term multimedia has been applied to mean systems capable of dealing with and displaying/playing electronic files of many sorts. It is clear that an enormous amount of human effort goes into preparing all of these files and documents, and a large portion of that time is devoted to editing such documents.

In the present discussion, problems described below as extant in the art extend in the present day to all sorts of electronic files and the end results of such files. Examples are provided to illustrate the sorts of problems to which the present invention is directed, but it will be clear to those with skill in the art that these problems attain in other areas, and the invention is applicable in such areas as well. For example, many of the problems that exist can he described with reference to the processes of reduction of ideas to hard-copy documents; the same problems, it will be clear, pertain also to reduction of ideas to such as video recordings, movies, and multimedia files of all sorts. It is to be understood, then, that in the remarks and examples that follow, although the examples may be limited to such processes as creating hard copy text documents from original human thought, the same processes or clear alternatives may also apply to different end results (multimedia presentations of all sorts).

As short a time as twenty-five years before the present invention personal computers were not yet developed, and the computers that were available, with some few exceptions, were less powerful in general than personal computers are today. In this time the process of creating documents was done in one or another of limited and limiting ways. The author of a text document, for example, could compose on-the-fly at a typewriter keyboard, or he or she could dictate copy orally to be typed and edited later. In the latter case, dictation could be to a person competent in the art of shorthand or one of the shorthand machines such as court recorders use, or to a tape recorder, which a typist would listen to at a later time to make a hard copy of the verbal input.

In these good old days, many authors of documents were either competent typists or became competent typists. Many others were not typists and had no interest in becoming typists, and were hence limited to dictation of one sort or another. Editing was a chore to be done after a draft was ready. In many cases if not most, to get a document to final form required several iterative edits.

With the advent of personal computers and word processing software applications electronic text documents have become common, bringing new capability to composition and authorship. The same advances in computers have made possible electronic recording and processing of other sorts as well in the fields of graphics, photography, video, and the like. In the field of text processing, word processors have enjoyed rapid development, and state-of-the-art word processing applications today provide powerful tools for rendering human thought into electronic text documents integrating text with formulas, tables, computer-generated graphics, and computerized photography.

Still, even with powerful word processing techniques many talented and creative people have limited interface skills to personal computers. That is, they still can't type competently, and have to rely on old-fashioned dictation to prepare electronic documents, wherein a second party translates recorded information into machine-readable text by typing into a computer word processor. These people include those who are in one way or another handicapped, and unable to type. Some are physically handicapped, and some have other limitations such as dyslexia.

Even for those creative people who are skilled and competent typists, however, and who have mastered the techniques of composing at the keyboard as well as editing with a word processor, the available tools for rendering human thought into machine-operable text code and finally into edited and finished documents impose strict limitations on human creativity. No human can type as fast as he or she can speak, and certainly not as fast as he or she can think. And, since humans have essentially single channel activity, output is thus severely limited when a composer is forced to compose or edit at a keyboard.

It is well-known that many millions of dollars have been spent by a number of organizations in the hope of developing useful voice-recognition systems which will recognize human speech and render it into machine-operable text code. This may be, when fully-realized, a fairly effective solution to the problems discussed herein. One could then render a first draft as fast as one can speak, then edit the electronic document. Unfortunately such systems have been less than wildly successful, and those that do work at least marginally require considerable computer power.

The problems in general voice recognition also are far from trivial. Different people say the same things in vastly different ways while ostensibly speaking the same language. Most people also run-on in speech, and a machine has a real problem determining where one word ends and another begins. Many decisions on alternative possibilities in speech recognition have to be made on the basis of context and/or grammar, comparing input with enormous amounts of pre-recorded information, and following very complicated software routines. Good speech recognition, when and if accomplished, is a job for powerful computers, while the real need is for systems capable of being used on portable and hand-held machines.

Even further with voice-recognition systems, even if they were to work seamlessly, they impose an additional burden. That is that the very first draft of any document is instantly turned into machine-operable text code. Subsequent editing still has to be done from a keyboard, and editing is often a bigger job than the original composition of a first draft. It would be much more efficient and much faster to a finished document if one could not only dictate a first draft, but then carefully edit by voice until the composition is in finished form, before turning the composition into machine-operable text code.

What is clearly needed in the area of conception and preparation of text documents is a system that greatly enhances a user's ability to voice record and voice edit prior to transcription. Such a system should record audio in a digital fashion and provide for what is known in film editing as jogging, which is the process of locating portions of a recorded entity to be edited. Functions allowing a user to fully-edit by voice before transcription is required would greatly speed the creative process.

As such a system as that described herein as desirable is essentially a recording and transcription system, it risks being heir to difficulties of such systems, such as the time-consuming process of editing a first draft after the draft is prepared from recorded input. The problem here is that the editing is done at the wrong time, after the recording is transcribed into machine-readable code. Much time and effort could be saved if full editing could be done in the audio form so the digitally recorded audio could be provided to a typist or data entry person in fully-edited, final form.

The system of the invention, as applied to creation of text documents, to solve the problem of incremental editing of machine-operable text code, which requires use of a keyboard, or editing in hard-copy form, should provide for rapid audio review and for abilities to edit voice recording much as a word processor electronic document is edited, such as recording over previous input, marking and moving or deleting existing data, inserting new voice-recorded date between other regions of data, and the like. With such an enhanced tool, a creative person could dictate a document which would be electronically recorded as digital audio, and then fully and rapidly edit the document either in the process of composition or after first composition as desired. A fully -edited, digitized audio file may then be provided to a competent typist or data entry person, either as a floppy disk or over a network connection such as the Internet, who can translate the audio via a keyboard directly into machine-readable text code, providing a finished document with a high degree of assurance that the document is in final form.

The functions described herein for digitized voice files are also useful for file records of other types of natural data, where natural data, like speech patterns, is considered to be streaming, unformatted data, unlike text code.

It is these objects to which the invention fully described below is directed.

SUMMARY OF THE INVENTION

In a preferred embodiment an Audio Editor is provided comprising a microcontroller for managing functions; a microphone port for entering voice; an electronic memory adapted for storing a file having digitally-recorded voice data; a speaker port for enunciating stored data as voice; a pointer system adapted for positioning a pointer at any position in the digitally-recorded voice data; a recorder function for storing voice input received through the microphone as digitally-recorded voice data in the file; and a delete function for selecting and deleting digitally-recorded voice data in the file. The pointer is movable in the file by operator input, voice recorded data may be selected and deleted by use of the delete function, and new voice data may be inserted into the file via the speaker port and record function at discrete points in the file indicated by the pointer.

In an embodiment the Audio Editor further comprises a communication link for linking the Audio Editor to a host computer, and the communication link is adapted for downloading and uploading files having digitally-recorded voice data. In another embodiment the Audio Editor pointer system comprises a two-direction input device biased to a neutral position, wherein moving the input device in one direction moves the pointer toward the beginning of a file, and moving the input device in the other direction moves the pointer toward the end of the file. The pointer system in some embodiments moves the pointer in the file at a rate which is a function of the degree of deflection of the input device from the neutral position. A preferred input device is a wheel spring-loaded to the neutral position.

In another embodiment the pointer system further comprises an enunciation function wherein, immediately following a new position of the pointer, the enunciator function vocalizes digitally-recorded audio data at the position of the pointer as an aid in identifying location in a file to a user.

Files used in Audio Editors according to embodiments of the invention ca have regions machine-operable text code as well as digitally-recorded voice data, the two types of data occupying different regions of the same file.

In some embodiments Audio Editors have an LCD display adapted for displaying information relative to stored files and functions of the Audio Editor, and in other embodiments there is a bar graph indicator adapted to display the pointer position relative to the beginning and end of the file.

A conversion application is provided to be operable on a personal computer having a display function for displaying a file wherein the file comprises both machine-operable text code and digitally-recorded voice data; a cursor function comprising a screen cursor moveable on the screen by input via a pointer device; an enunciator for rendering digitally-recorded voice data as audible voice; and an input for receiving machine-operable text code. The display function displays the file with machine-operable text code rendered as text and digitally-recorded voice data displayed as voice regions, and the cursor placed in one of the voice regions causes enunciation of the voice data in the region. In a preferred embodiment input of machine-operable text code with the cursor in a voice region results in text being displayed in place of equivalent portions of the voice region. The voice-recorded data is retained in some embodiments and is later accessible in voice rendition even though text has been entered in the voice region, for comparison to the entered text to replace the voice data.

In yet another embodiment a word processor application operable on a personal computer (PC) is provided, comprising a word processor file loadable and displayable on a display monitor, the file having a first region adapted to contain machine-operable text code and a second region adapted to contain digitally recorded voice data; a display function adapted for displaying the file, wherein the first region is displayed on a PC screen as text, and the second region is displayed on a PC screen by a non-text graphical indication of voice data; a cursor function adapted to display a cursor on the PC screen, the cursor moveable on the screen by manipulation of a pointer device; and an audio editing mode. In the audio editing mode, the cursor is operable to enable the second region at a specific point to receive voice and insert the same as digitally-recorded voice data, and to select and enunciate and to select and delete digitally-recorded voice data.

In some embodiments the word processor application further comprises a conversion mode, wherein placing the cursor in the voice region causes the voice data to be enunciated, and wherein entry of machine-operable text code replaces the voice region display on the screen with text characters at the same time replacing the digitally recorded voice data in the word processor file with machine-operable text code. In other embodiments the replaced digitally-recorded voice data is retained associated with the file in a manner to later be accessed and compared with the text entered to replace the voice data.

In yet other embodiments a word processor is provided comprising a personal computer having a display monitor with a display screen; a microphone port; a speaker port; a word processor file loadable and displayable on a display monitor, the file having a first region adapted to contain machine-operable text code and a second region adapted to contain digitally recorded voice data; a display function adapted for displaying the file, wherein the first region is displayed on a PC screen as text, and the second region is displayed on a PC screen by a non-text graphical indication of voice data; a cursor function adapted to display a cursor on the PC screen, the cursor moveable on the screen by manipulation of a pointer device; and an audio editing mode. In audio editing mode, the cursor is operable to enable the second region at a specific point to receive voice and insert the same in the file as digitally-recorded voice data, and to select and enunciate and to select and delete digitally-recorded voice data. This word processor may also have a conversion mode, wherein placing the cursor in the voice region causes the voice data to be enunciated, and wherein entry of machine-operable text code replaces the voice region display on the screen with text characters at the same time replacing the digitally recorded voice data in the word processor file with machine-operable text code. In some embodiments the replaced digitally-recorded voice data is retained associated with the file in a manner to later be accessed and compared with the text entered to replace the voice data.

The Audio Editor of the present invention in its several embodiments, including those embodiments operable on PCs as applications with Audio Editing functions provide a system for creative persons to create documents in a manner completely avoiding keyboard input or manual editing of text. Text conversion is placed at the end of the creative process, where it logically belongs to allow the quickest possible creation and editing of documents. The system of the invention in its various embodiments also provides for fast and efficient composition and editing without access to a full-service PC.

In broader embodiments of the invention a computerized natural data editor is provided comprising a natural data stream stored in an addressable digital file; an interactive serial graphic presentation of the natural data stream on a display; a pointer function for selecting portions of the graphic presentation; and user-selectable editing functions applicable to the selected portions. In such embodiments a chosen editing function directed to a selected portion of the graphic presentation of the natural data stream causes the editing function to be applied to the stored natural data stream, thereby altering the addressable digital file.

In natural data editors according to embodiments of the invention the data stream may be a voice data stream stored as a digital voice recording, a video data stream, a musical data stream, or a natural data stream of any sort. The interactive serial graphic presentation may a series of lines on the display is arranged in the manner of English-language text, line-by-line, the serial characteristic advancing from left to right, or arranged in a wide variety of other ways. The editing functions may include one or more of Play, Block, Delete, Copy, Move, Insert and Replace.

Natural data editors and editing techniques as taught herein provide a new way to deal with data and the information age in general, and provide new tools for creative persons to gather, create, edit, and compose data natural data, and to accomplish the processes from mental conception to finished works with speed and alacrity. Specific examples of natural data editing devices and methods are described in detail below, sufficiently to allow those with skill in the art to practice the invention.

DESCRIPTION OF THE PREFERRED EMBODIMENTS

A Hand-Held Audio Editor

Figure 1:
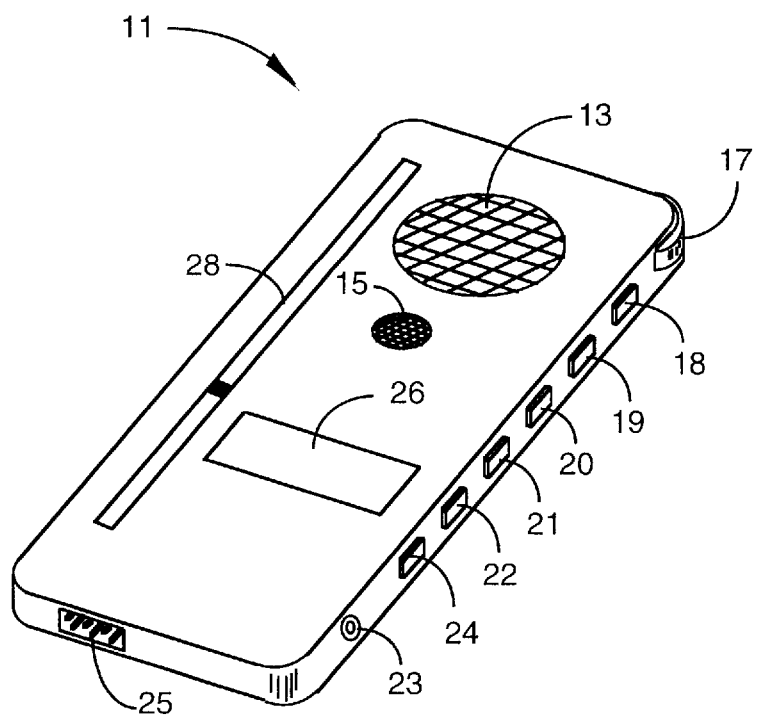
FIG. 1 is an isometric view of a digital recording instrument according to a preferred embodiment of the present invention.
Figure 2:
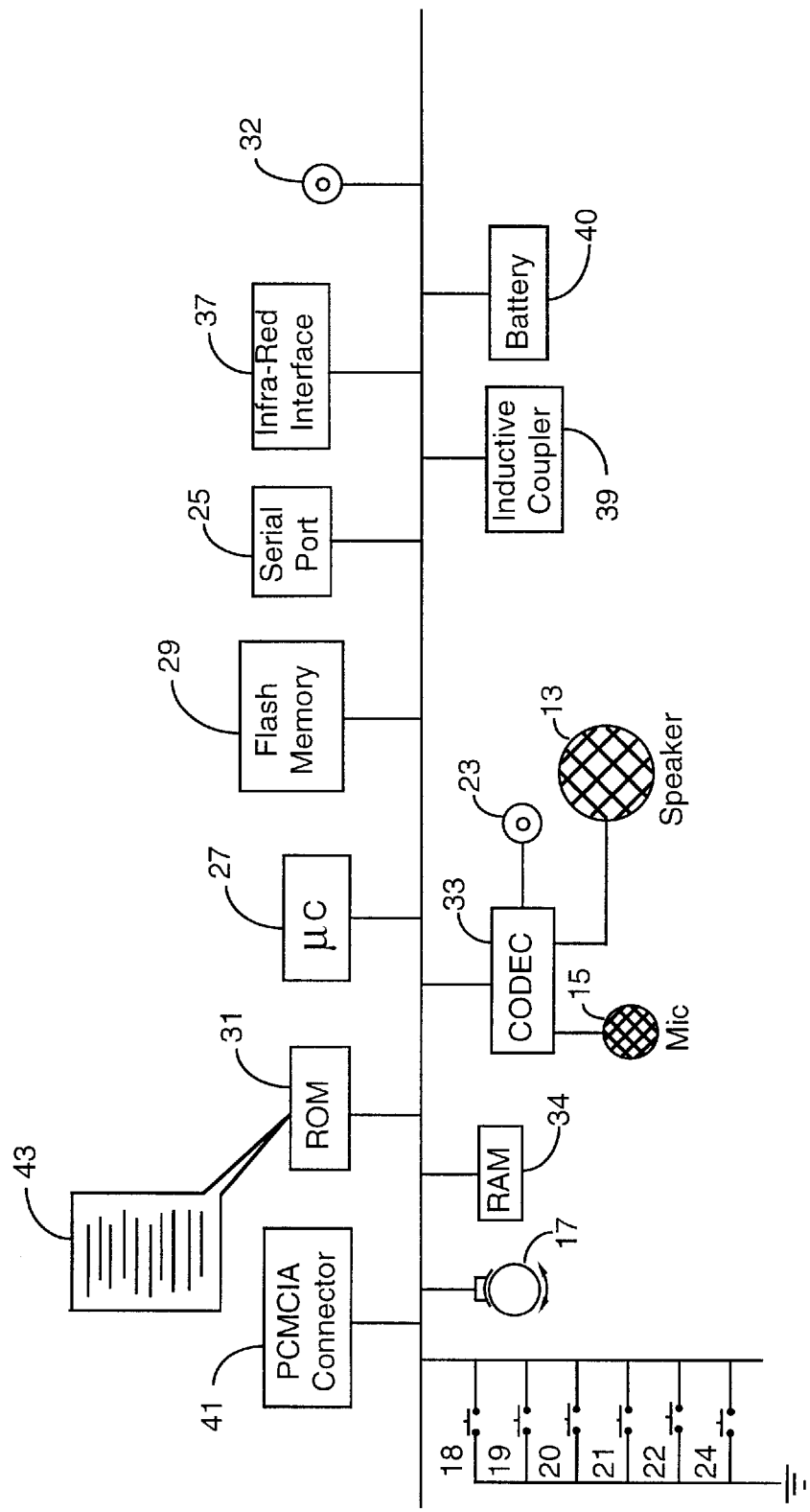
FIG. 2 is a block diagram of internal elements of the digital recording instrument of FIG. 1.

Many aspects of the present invention may be illustrated by a specific example of a digital voice recorder instrument incorporating unique functions according to embodiments of the present invention. FIG. 1 is an isometric view of such a digital recording instrument 11 according to a preferred embodiment of the present invention, and FIG. 2 is a block diagram depicting elements internal to instrument 11 of FIG. 1. In this specification device 11 will be referred to as an Audio Editor. Referring first to FIG. 1, Audio Editor 11 in this embodiment is a hand-held device, and shares a shape and form common to other hand-held digital devices such as personal digital assistants (PDAs) and hand-held computers.

Audio Editor 11 in the embodiment of FIG. 1 has a speaker 13 for vocalizing digitally-recorded audio data and a microphone 15 for accepting from a user audio input to be recorded. There is in addition a jogging wheel 17 implemented at one corner of the instrument for a user to manipulate, typically by use of the thumb of the hand holding the instrument, to select position in an audio file.

Jogging is a term borrowed by the inventors from the editing arts, particularly as applied to editing film and the like. In such editing, rapidly moving a section of film through an editing display to select portions to be discarded or altered in some way is called jogging, because as one moves the film rapidly one may overshoot a desired position and have to jog the film to find the position wanted for editing. The process of jogging as applied to digitally recorded audio files is more fully explained below.

Referring still to FIG. 1, there are, in addition to the jogging wheel, multiple control buttons, also accessible by a user's thumb, implemented on a side of audio editor 11. In different embodiments there may be different numbers of control buttons to access different functions and the like, and the buttons or an area near each button may be labeled to indicate the function of the associated button. In the embodiment shown there are six control buttons 18, 19, 20, 21, 22, and 24. In alternative embodiments there will be alternative ways to select functions, such as by simple voice-recognition, wherein simple commands may be spoken to and recognized by the Audio Editor. There is further a well-known headset jack 23 and a serial port connector 25. The purpose of the headset jack is to provide for a user to make use of a telephone headset that may have both a microphone and headphones. This is a convenience for use of Audio Editor 11 in places where voice input and playback might be a bother or distraction to other persons, such as in a crowded office. The function of serial port 25 is to provide communication of audio files to a computer, such as a laptop or a desktop computer.

The headphone jack is a convenience and optional and in some embodiments is not used for lower cost, in which case all audio feedback is via speaker 13. Serial port 25 is also optional in the sense that there are other well-known methods and apparatus for communication between such a device as that described herein and a host computer. For example, rather than the serial interface shown, there may be a parallel connector or an infra-red communicator. In some alternative embodiments communication to a host is accomplished via an inductive-coupling apparatus known to the inventors. In still other embodiments audio editor 11 is adapted as a PC (PCMCIA) card having a multi-pin parallel connector, and may be docked directly in a PC card slot in a host, thereby establishing communication and enabling transfer of digitally-recorded audio files to a host.

In addition to the elements above-described, there are in some embodiments an LCD display 26 for providing relatively simple displays in conjunction with functions of the Audio Editor. For example, in file selection file numbers or names may be displayed for selection of files to be loaded for editing. As another example, a soft key system as known in the art is used in some embodiments in conjunction with display 26 for function selection. In such a system, one physical input is used for scrolling through function names and another for selecting a displayed function.

Another optional element shown for Audio Editor 11 is a bar display 28 used in some embodiments as an indicator for relative pointer position in a file. Pointer concept and pointer position are described more fully below.

Internal Elements of an Audio Editor

Referring now to FIG. 2, Audio Editor 11 has a microcontroller 27 for managing functions of the recorder, a flash memory 29 for storing largely audio as digital files, a ROM chip 31 for storing operating code routines, and a random access memory 34 for temporary operating storage. RAM is not strictly necessary in most embodiments of the invention, but is convenient in many embodiments. It will be apparent to those with skill in the art that this architecture is convenient, and could be implemented in other ways allowing operation and recording according to objects of the invention.

In FIG. 2 a coder/decoder (CODEC) 33 is shown for digital/analog communication between internal elements of the recorder and speaker 13 and microphone 15. All of these elements are connected by bus 35. Also connected to bus 35 are jogging wheel 17 and input pushbuttons 19 and 21.

Serial port 25 is shown connected to the bus as well as an infra-red interface 37, an inductive coupler 39, and a PCMCIA connector 41. It is not necessary that each of these interfaces be present, as only one interface apparatus is needed, so it is to be understood that some of these interfaces are optional. Further, in still other embodiments instrument 11 may be connected to a host by any one of the interfaces described, or by an alternative communication interface, and the functions of the microprocessor, ROM and Flash memory, or any of these or other functions, may be supplied by elements of the host to which the instrument may be connected. In still other embodiments the elements needed for practicing the present invention may be implemented in a computer keyboard, a computer housing, a monitor housing, a digital telephone, and in a number of other ways.

Referring again to FIG. 2, a set 43 of operating routines is embedded in ROM 31, and controls the interaction and overall function of elements of the system shown. It will be apparent to those with skill in the art that the operating software may be added and stored in a number of different ways, and the manner shown is convenient.

An important object of the invention is to provide an enhanced apparatus and method for preparing and/or editing an electronic file from which a finished document may be prepared. Audio Editor 11 therefore operates with an electronic (digitally recorded) voice file. In some cases files are created in Audio Editor 11, and in others files may be downloaded to Audio Editor 11 from a computerized host, such as a PC. In either case Audio Editor 11 is operable to allow a user to add data to the body of the file, and also to quickly and efficiently edit the file until the user is satisfied with its finished form, after which the file is passed on, typically to a host PC, where it may be further processed or be passed on to other digital apparatus to be further processed. By further processing is meant transcribing the prepared and edited file into a finished file of the form of a word processor file in machine-operable text code, so hardcopy documents may be printed therefrom and the file transcribed file may be forwarded, copied, and so forth like any other word processor file.

Data Files for an Audio Editor

Figure 3:
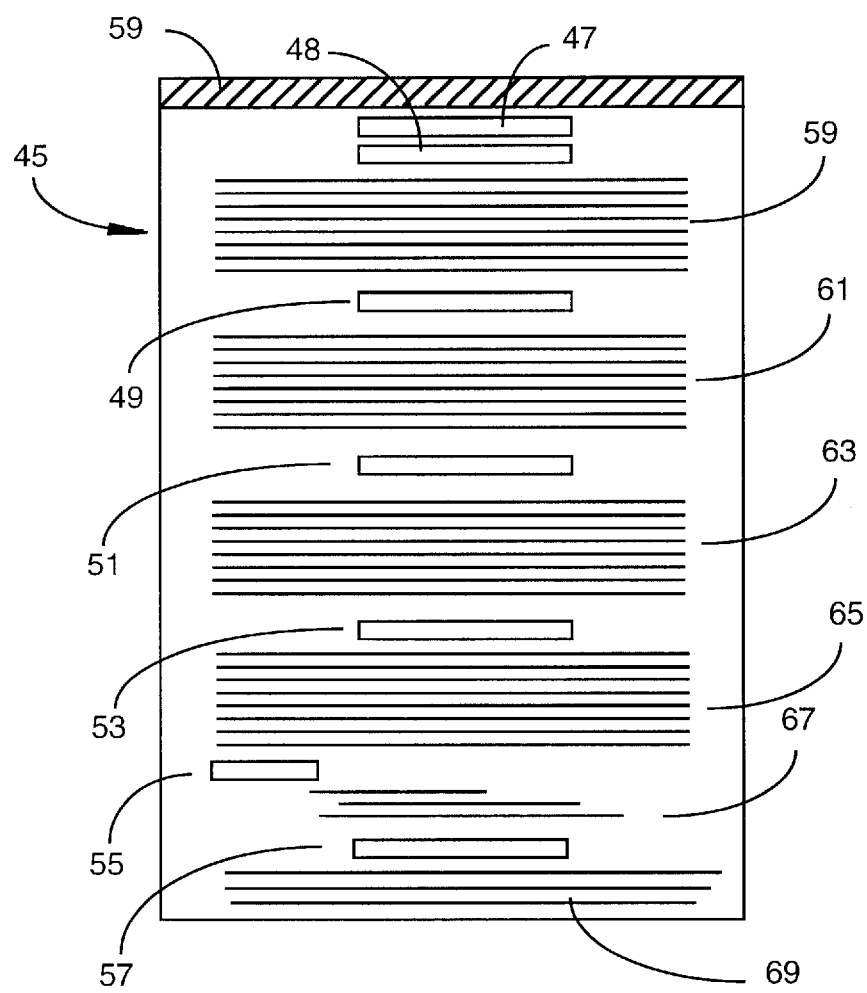
FIG. 3 is a representation of a data file according to an embodiment of the present invention.

FIG. 3 is a representation of one embodiment of a data file 45 as used in Audio Editor 11. As was described above, a file may be created in Audio Editor 11, or files may be created in another digital device and downloaded to Audio Editor 11. If a file is created in Audio Editor 11, the file may be, but is not limited to, completely an audio file. That is, the file may consist entirely of digitally-recorded voice data as entered via microphone 15 or via a headset connected to port 23 (FIG. 1).

In the case of files originally downloaded to Audio Editor 11 from a host, or files cloned from such downloaded files, the files may have a very special nature. These files may have portions that are machine-operable text code, as in a PC word processor file, and other portions that are digitally-recorded voice. In the present example a dual-nature file of this sort is used for illustration of the invention, because it is the more complex of the cases.

The dual nature of file 45 is particularly important because the final desirable form of a file to be prepared and edited is the form of machine-readable code, such as a finished word-processor document. The dual nature of file 45 allows starter files to be prepared and downloaded to an Audio Editor according to an embodiment of the invention, wherein the file is essentially a word processor template, having formatting established as from a stored style sheet, and also having, for example, a title block, headings, subheadings, formatted headers, footers, and the like. In a preferred embodiment then, the nature of file 45 is a formatted word processor file having sections wherein data may be added and edited as digitally recorded voice.

Sections such as headers, footers, subheads, and the like, represented in FIG. 3 by elements 47, 48, 49, 51, 53, and 55 cannot be edited in Audio Editor 11, because they are machine-operable text code, but may be rendered as synthetic speech by control routines known in the art, known as text-reading software. That is, one may review all parts of such a file in the Audio Editor, but may only enter, add to, and edit the digitally-recorded audio portions. This is perfectly acceptable for the objects of the invention, because the purpose of a template is to assure that certain parts of a file are relatively fixed. In the case of formatting and the like, this assures as well that a worker at the end of the process, who will render the audio portions into machine-readable code like the rest of the file, will not have to deal with formatting, fonts, spacing and the like. This is all set in the template. As will be seen in further description, however, a transcriber for a file according to embodiments of the invention may in many cases be able to add formatting to text he/she enters while transcribing audio portions into machine-operable text. Such things as underlining, italicizing, bolding and the like may be needed.

For purposes of illustration it may be assumed that the template that is file 45 is a template for producing the present patent application, or a patent application based on the same form, including headings, subheads, global formatting and the like. In this particular case elements 47–57 are the headings and subheadings of this specification, such as Field of the Invention; Background of the Invention; and the like.

In between headings and other portions of machine-readable code, which may be referred to generally by the common art term "boilerplate", there are in file 45 portions reserved for digitally recorded voice, such as portions 59, 61, 63, 65, 67, and 69.

Referring now to FIG. 2 showing internal elements of Audio Editor 11, file 45 and similar files may be downloaded via any convenient data link to a host, and several alternatives are shown, to, for example, flash memory 29. The importance of flash memory for editing and other processing as described herein is that flash is non-volatile memory, there is no energy expenditure in maintaining data in flash between editing functions, and flash is relatively energy efficient to operate. These are important considerations in a hand-held device such as Audio Editor 11, which may be battery powered for portability as well as powered by a DC or AC converter when outlet power is available. Battery system 40 is shown in FIG. 2, as well as a port 32 for input from a power converter not shown.

Functions of an Audio Editor

Referring to FIG. 1, a series of control buttons 18–23 are shown. These buttons are exemplary, and represent one form of apparatus for selecting functions and the like. No labels are placed on these buttons, because the assignment of functions to these exemplary buttons is somewhat arbitrary. It will be apparent to those with skill in the art that there are many devices, mechanisms and systems for allowing incremental input to such devices as the hand-held Audio Editor.

In the embodiment shown, one button may be dedicated to a power on-off toggle. When one turns on the power, just as when one turns on a computer, there will be startup routines performed after which the system will wait for input. The inventors intend in this embodiment that there be storage space for a limited number of files, depending on the size of files downloaded. For purposes of illustration it will suffice to consider three files stored in flash 29, although in many embodiments more files or fewer files may be stored. A simple file ID is used, in this case each files is numbered 1, 2, and 3, and so forth according to the order in which the files are downloaded to or created in the Audio Editor. In the embodiment described with the aid of FIG. 1 there is no video display, which renders file listing and scrolling of filenames difficult. With a limited number of files stored, a simple numbering scheme is considered by the inventors to be sufficient, as a user can find a desired file to edit simply by random selection and having titles vocalized by the editing system.

Because files as described for downloading to and editing in Audio Editor 11 are often created in a host computer, and one of the important objects of the invention is to be able to transfer files created, expanded, and/or edited in Audio Editor 11 to a host computer, and perhaps from such a host to other computers, such as over the Internet or other network connection, files typically will also have PC compatible filenames. These filenames, and in some cases other data, are embedded in file 45 (FIG. 3) in a field 59 shown as a leading field in the file.

In the embodiment described herein thus far, to use the system after power on it is necessary to select a function to proceed with any action. Typically the first action after power on will be to select and load a file. As described above, multiple function selection buttons along one side of the Audio Editor are used for function selection. As there are more functions than selection buttons schemes are utilized in which combinations of buttons are used to select single functions. In other embodiments, as described above, other function selection schemes are used, such as a softkey system in conjunction with a display 26. As function selection may be done in a number of different ways known in the art, detailed description of further function selection actions will not be made herein. Implementing function selection in an Audio Editor to practice the present invention should not be a problem for those with skill in the art.

The first action after power up, as described above, will typically be selecting a file to expand/edit. At this point one or more files are available to be edited, stored in (typically) flash memory 29. In some embodiments having sufficient RAM 34, a file retrieved from flash memory 29 is stored for expansion/editing in RAM 34. In other embodiments operation is direct with flash memory 29. In the case of direct operation it is necessary in many editing functions to create temporary storage in the flash so data is not inadvertently lost. If one deletes a portion of a file, for example, it is desirable that a copy of the deleted data be retained at another location in memory for a time, against the probability that some or all of the deleted data may be later needed. The load function is paired, as is true in most file processing systems, with a Close function, whereby a loaded file may be unloaded, or closed, in favor of opening another file.

Once a file is loaded, one may select other functions for expanding and editing the loaded file. A loaded file is also automatically integrated with a feature of the invention termed herein an audio pointer, or just a pointer. This pointer bears some resemblance to a text cursor in a word processor, but differs in some important aspects, which will become apparent as operation of the pointer, and of the pointer with other functions, is further described below.

For a just-loaded file the pointer is, by default, positioned at the beginning of the file. Not the beginning of reference data, but at the beginning of data that can be processed, which, in most cases, such as the patent specification example used herein and depicted in FIG. 3 as file 45, will be at the beginning of the title block of the document. Expansion and editing functions will apply to the file typically at the position of the pointer, or apply to portions of the file that may be blocked or otherwise indicated by the pointer.

As device 11 is an Audio Editor, the pointer in most cases can not be seen. An exception is in those embodiments that utilize a bar graph display 28 (FIG. 1), wherein a line or bar is movable along the length of the bar graph, providing a relative indication of the pointer. In these embodiments as the pointer is moved in a file, the position of the pointer bar in the graph is updated, with one end of the bar extent being the top of the file and the other end being the end of the file.

Pointer movement in most embodiments of the invention is accomplished by jogging wheel 17. Wheel 17 may implemented in a number of different ways, and in some embodiments may be other than a wheel, such as a joystick or a pressure pad. In a preferred embodiment the jogging wheel is indeed a thumbwheel, and the thumbwheel is spring-loaded in both rotary directions to return immediately to a preset neutral position whenever an operator releases the wheel. If one moves the jogging wheel counter-clockwise (CCW-upward motion with the thumb) the pointer moves toward the beginning of the loaded file. If one moves the jogging wheel clockwise (CW-downward motion of the thumb) the pointer moves toward the end of the file. In this embodiment the pointer moves more quickly or more slowly through the file depending on the rotary deflection of the jogging wheel from the neutral position, and the spring loading of the jogging wheel is adapted to provide more restoring force toward the neutral position according to the amount of rotary deflection from the neutral position. A user then has fine control of pointer movement and positioning.

As the pointer position in a loaded file is either not seen or seen only relatively, a unique mechanism is used in embodiments of the invention to indicate pointer position to the user. When one moves the pointer by manipulating the jogging wheel, the system, when the jogging wheel is released, vocalizes a portion of the file at the position of the cursor. The portion vocalized is adjustable by a user to suit the user's individual preference. For example, by default in the control routines, the portion vocalized at a new pointer position each time the jogging wheel is used to move the pointer may be one second of data in real time.

In this scheme, one second of vocalization of data is one second in real time. The actual amount of data that is vocalized is dependent on another factor, which is the vocalization rate. The inventors have discovered that most users can recognize vocalized data and deal with it appropriately at faster speech than normal, that is at faster rate than originally recorded. Hence in the present invention, by default, vocalization is done at twice the rate that data is originally recorded. For vocalization of text data (machine-operable text code) an estimated rate is used to accomplish the same purpose. To avoid distortion effects, a special DSP (digital signal processor) is used, or the microprocessor may be used if it is powerful enough in a particular embodiment, to render the vocalization in the tone and timbre of the original recording, although the rate is speeded up.

In many embodiments some other pointer positioning functions may be used, such as Go To Top of File, Go To Bottom of File, Go to Next Header Up, Go to Next Header Down, and so forth. In these cases, vocalization at the new position of pointer movement is used in the same way as for pointer movement accomplished with a jogging wheel.

One other similar aid is used to help a user know pointer position in a file. In the case of special templates, such as the Patent Application template that has been referred to in the specification, the combination file is adapted to vocalize location information as well as, or instead of, or in addition to, actual recorded input. For example, when one moves the pointer to the Title of the Invention in such a file, the file will tell the user in a voice or manner distinct to differentiate from vocalized text or voice recorded data, where the pointer is. In this case the system may say "Pointer at head of title block" or "Pointer in Background section", for example. Such messages can be provided by a table of standard vocalized messages, and can be very helpful in locating pointer position. In some embodiments a function is provided, identified by a question mark "?", for a user to call to have the system recite pointer position.

It is important to note that although data is vocalized at a new pointer position, beginning at the pointer position, the pointer position is not moved by the fact that vocalization occurs in this circumstance. The vocalization after pointer position movement is to indicate to the user where the pointer is in the file. In some embodiments a function is provided to extend vocalization at new pointer position, because in some cases the short vocalization may not be enough to truly indicate the new pointer position.

Figure 4:
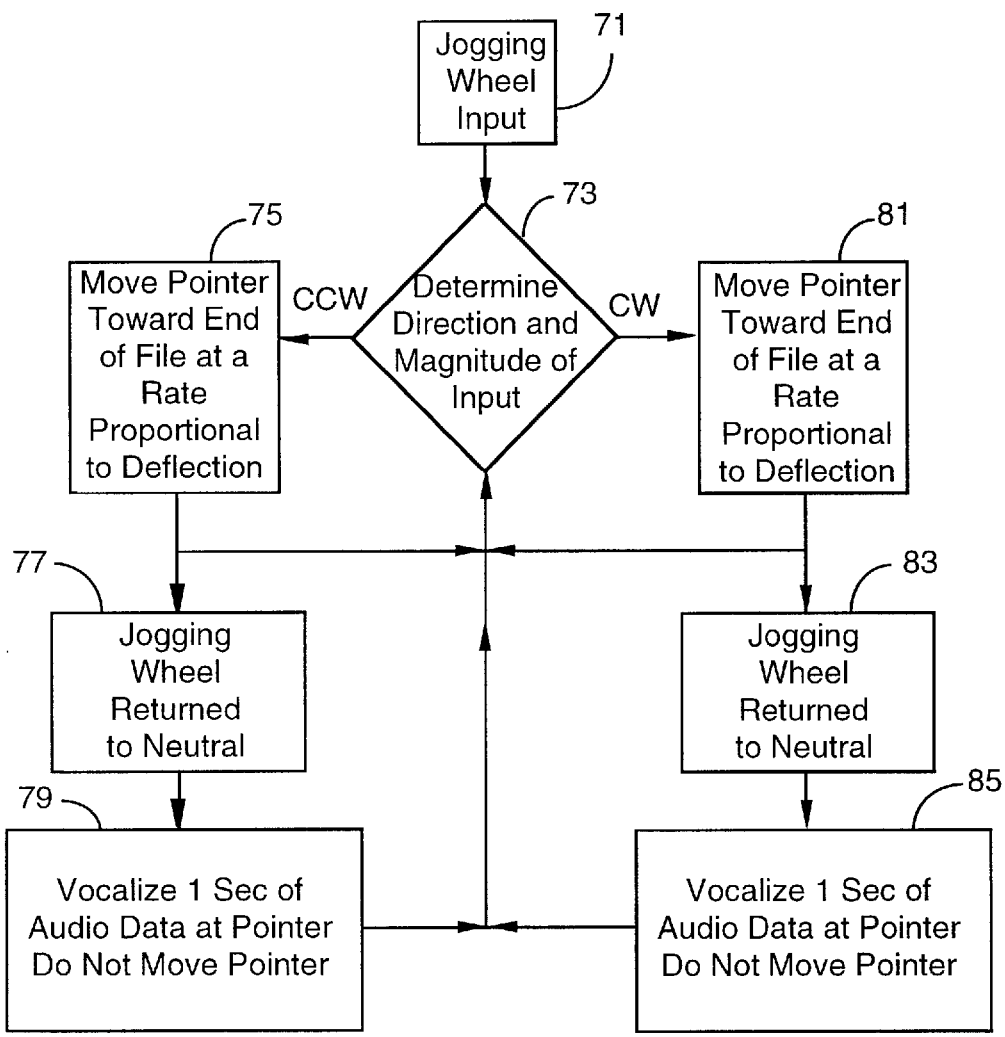
FIG. 4 is a flow diagram illustrating a Jog function according to an embodiment of the present invention.

FIG. 4A is a flow diagram illustrating the jog function in the embodiment described immediately above. At step 71 a user moves jogging wheel 17. At step 73 the system recognizes and quantifies the input. If the movement is counter-clockwise control goes to step 75, and the pointer is moved toward the end of the loaded file at the rate determined by the rotary deflection applied to the jogging wheel. This rate is automatically adjusted as a user varies the amount of deflection by virtue of looping back through steps 73 and 75. When the system senses that input has stopped (jogging wheel returns to neutral) at step 77, control goes to step 79, and the system vocalizes a portion of the file beginning at the new pointer position. After vocalization control loops back to step 73 to watch for new jogging wheel input.

If at step 73 the input is clockwise (CW) pointer movement and vocalization is accomplished through steps 81, 83, and 85 in the manner described for CCW deflection of the jogging wheel, except the pointer is moved toward the end of the file. In this manner one may move pointer position throughout a loaded file, and recognize pointer position by audio characteristics rather than by visual characteristics as is typically done in a conventional word-processor file.

Referring now to FIG. 3, and referring to the circumstance wherein file 45 is a dual-nature file, having some portions being machine-operable code in the fashion of a conventional word processor file, and some portions digitally-recorded voice, a play function is available to user's in the Audio Editor in various embodiments of the invention, and a user may use this function to vocalize all parts of a file. Machine-operable text code is vocalized by routines as known in the art, and digitally recorded audio is played also as known in the art for revocalizing such data.

When the Play function is called, the system vocalizes data, either machine-operable code or digitally-recorded voice, beginning at the position of the pointer in the file. Once Play is called, the system will continue to play until the user activates a Stop Play(or just Stop) function. As in the automatic play following a repositioning of the pointer in a jogging function, the Play operates at faster than normal voice. An important object of the Audio Editor is to provide for a user a new and rapid way to create and edit a file before converting the file entirely to machine-operable code, as it is the inventors' belief that such a tool will allow creative people to accomplish significantly more than has been provided by conventional word processing and dictation systems. Just as in the automatic Play function associated with pointer movement, the rate of vocalization may some embodiments be adjustable by a user.

In the Play mode in a preferred embodiment the pointer moves, keeping pace with the vocalization of data, so when the user activates Stop Play, the pointer will now be at a new position, being the point at which Play was Stopped. In many embodiments a function called Return associated with Play moves the pointer immediately back to the position it held in the file at the beginning of the Play function. One may also, of course, after stopping a Play function, use Jog to reposition the pointer.

Another essential function for the Audio Editor in embodiments of the invention is Record. When a user selects Record, a recording mode becomes active, and the system will record the user's voice input beginning at the current pointer position. In Record the recording apparatus of the Audio Editor becomes active, typically voice-activated, so the system will record the user's voice input as received into the open file. In Record the pointer moves with new input as in Play, and the Return and Jog functions allow the user to reposition at any time desired.

Record is by default in most embodiments of the invention an insert function, rather than an overwrite (or voiceover) function. That is, if a user positions the pointer in a region of already-recorded voice data, and then activates Record, the voice-activated Record function becomes active, and the system will insert any new voice data between the data ahead of the pointer and the data behind the pointer. This is because an overwrite function would be difficult to implement that could simultaneously show a user what data was being lost, and this could lead to important data being lost.

The Jog and Play functions are provided for a user to find positions in the file where additions, editing, or other functions are to be performed. Record allows a user to make voice additions, which are recorded as digital data as is Known in the art. To provide for a fully-edited document, however, as has been indicated is an important object of the invention, other editing functions are needed. These additional functions are close cousins to functions available in most high-end word processors.

One of the additional functions is Block, wherein a block of digitally-recorded voice data may be selected. In a preferred embodiment Block is accomplished by a Start and a Stop input such that when Start Block is called the system begins vocalizing at that point, and identifies the data as Blocked data as the data is vocalized. When a user hears the system reach the point at which he or she wishes the Block to end, he/she calls Stop Block. The system then stops, leaving the recited data as Blocked data. After Stop Block is called, the Blocked data remains Blocked until the user calls an associated function indicating a desired purpose for the Blocked data. Also, with data blocked, the Jog wheel may be used to adjust the Stop Block point, that is, the point in the data at which the Block ends. In this manner voice data can be precisely selected for some other function.

The functions associated with Blocking data are very similar to the functions of a word processor also associated with blocked data. These are Cut, Copy, Paste and Delete. Cut removes the Blocked data from the file at the position it previously held, and closes the gap in the data file relative to storage addresses and the like in the memory holding the data. With Cut a copy of the Blocked Data is retained to be perhaps Pasted into a different position in a file. With data Blocked a user can jog to a new position in a file, and call and execute the Paste function, which will put the copy of the Cut data into the file at the new pointer position.

Copy works much the same, except the Blocked data is left in the file, and copy of the Blocked data is created and may be pasted into the file at a new position found by Jogging or by some other means of moving the Pointer.

Delete of course does just as the name implies. The Blocked data is deleted from the file. In some embodiments a special copy is made with delete, and a user may retrieve this copy and do something else with it at a later time.

Using these functions, one may create a voice file and fully edit the file after creation, providing a file to be uploaded to a host and provided to a transcriber at any location in the world with which the host may communicate, such as by e-mail, by voice telephony, by mail as a floppy-disk, with a large number of other files on a removable Winchester cartridge, and in many other ways that may be apparent to those with skill in the art.

There are, in many embodiments, other functions that may be called and used in the processes of creating, expanding, and editing files. One such is Find, wherein a user may speak a word or a phrase, and the system will rapidly search the document for a data string to match the digital print of the spoken phrase, moving the pointer to the beginning of a data string that matches.

Many functions familiar to users of word processors will not be available in some embodiments of the Audio Editor, such as formatting functions for line numbering, margins, line spacing and the like. Such functions are expected by the inventors to be placed in a combination file before the file is downloaded to an Audio Editor, by functions like style sheets familiar to word processor users. Formatting functions can also be added to a file after the file is uploaded to a host, or transferred to any machine capable of handling the file as a word processor file. These operations and the unique aspects of such machines according to embodiments of the present invention are described more fully below. This is not, however, to limit an audio editor according to the invention to an absence of such functions. Functions may be available for inserting some identifiable formatting codes in the integrated, dual-nature files.

Since the Audio Editor is, as the name implies, a voice system, no provision is made in the Audio Editor itself for inserting or processing photographs or graphics. This is not to say that graphics cannot be used. Graphics may be added and processed in a combination file in a PC or other computer outside Audio Editor 11, and may be present in a file downloaded to Audio Editor 11, but will not of course be vocalized. One may still move the pointer and operate with the digitally-recorded voice text.

An Example of File Creation and Editing

As an example of the functional proficiency and operation of an Audio Editor according to an embodiment of the present invention, as described above, consider now the creation of the present patent application specification. It is well known that there is a preferred form for patent applications, and a word processor template may be prepared having all of the proper headings, preferred margins, line numbering, page numbering, preferred font and font size, and so forth. Such a template may prepared on any high end word processor, such as Microsoft Word™, with all of the headings and formatting. The file is then imported into a special application running on the same machine, a PC for example, and rendered in a form to have portions of digitally-recorded voice as well as the machine-operable code that is common. The file is then downloaded to an Audio Editor as described above.

When the file is called up on the Audio Editor, it is as represented in FIG. 3, although the file's data is not displayable on the Audio Editor. A patent attorney or agent using the Audio Editor then may move the pointer to, for example, the title block area 47, and enter a title by voice. He or she may then move the pointer to the area just below the heading of Field of the Invention, call the Record function, and proceed to recite a field for the invention. Next the pointer is moved to the area below Background of the Invention, and the user recites a background for the invention. In this manner one may proceed through the entire composition of a patent application without being limited by having to type in machine operable code.

Up to this point the operation is much the same as one might do with a conventional recorder, except with the conventional recorder one cannot arrange the distinct parts of the specification related to headings and in a formatted manner.

In the expansion phases of the process, wherein one is entering such as background, descriptions of preferred embodiments and the like, one may be guided by drawings, notes, and the like, and may make sketches and notes as the process proceeds. This process is uniquely faster than composing at a keyboard.

Unique to embodiments of the invention, at any time in the process of composition one may edit the existing recorded voice data using the audio editing functions described above. For example, as new ideas for drawings are developed the composer/user can go to the Brief Description of the Drawing Figures, and list new drawings. If one has an electronic tablet, he/she may prepare electronic sketch documents as part of the overall process, which may subsequently be uploaded to a PC application as bit-mapped templates for preparing more formal object-oriented drawings to accompany the patent application.

Further, one may edit to any desired extent until the combination file is complete and in a final form as far as creative content is concerned. The entry and editing functions in this case are accomplished in the fastest mode possible (by voice entry and audio editing) and it remains only to convert the voice-recorded portions to machine-operable code as a final step. Again, the final step is where the conversion to machine operable text code really belongs, so no creative work has to be limited by keyboard entry.

The Final Step—Conversion Application

After a file is finished in the Audio Editor, it may be uploaded again to a host, such as a PC, and may be communicated anywhere in the world to persons contracted to do the final step of conversion. The file is an electronic file, and can be sent to remote locations by e-mail attachment, by modem, as a floppy disk file, and in other ways. An operator may do the final conversion anywhere, and return an electronic file in word processor format, which may be used to print hardcopy documents and so forth. Of course the word processor file may be further edited by keyboard if desired, and may even be reloaded to an Audio Editor wherein new material may be added and edited by voice, and the file may again be sent to an operator for conversion by data entry. In this case, any of the functions of the Audio Editor that do not require data entry may be used for machine-operable code as well as for voice recorded data. That is, in an Audio Editor, for text that is already in ASCII format, for example, one may delete such text, copy, cut and paste it, and replace portions of such text with added voice data.

Figure 5:
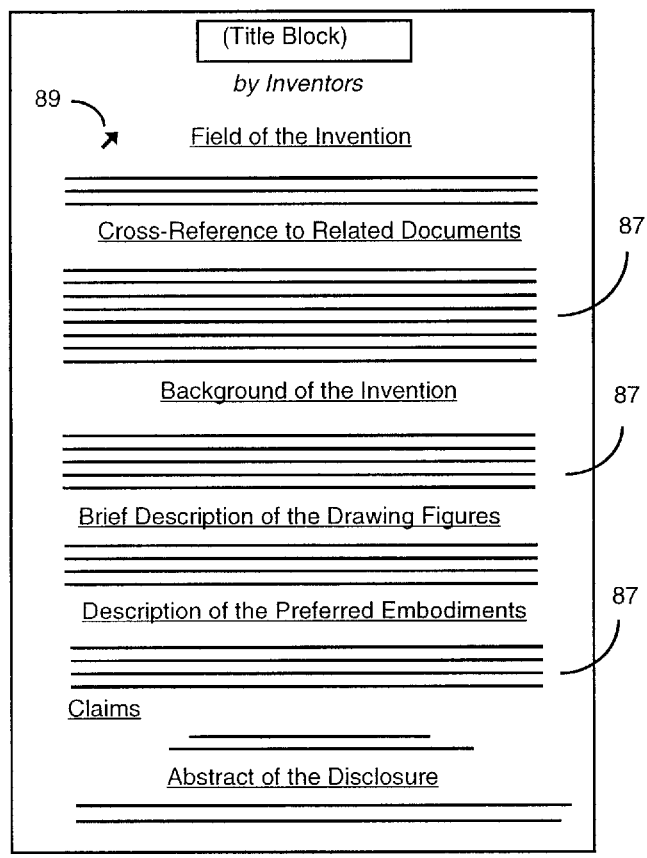
FIG. 5 is an illustration of a display provided on a video display monitor of a computer according to an alternative embodiment of the present invention.

When a file such as file 45 of FIG. 3 is uploaded to a machine such as a PC and opened in a conversion application according to an embodiment of the present invention, the first page will appear in general as shown in FIG. 5. There may be, of course, many other pages with other headers, and, as further data is entered via a Record function in an Audio Editor, the headers shown may be pushed eventually to other pages (repagination), but the basic features may be illustrated by FIG. 5.

The PC conversion application in an embodiment of the present invention is, in many respects, a word processor application. In some embodiments it is implemented as additional functionality for an existing high-end word processor. In this application the file as uploaded from the Audio Editor appears as in FIG. 5 with all of the headers rendered in text and with the formatting as entered in the original file prepared for and downloaded to the Audio Editor. The portions entered and edited in the Audio Editor as digitally-recorded voice are rendered on the screen as blanked lines, such as shown in regions 87. The area occupied by such lines is related to the recorded material by an estimating algorithm, which operates by the known rates and time of recording.

A text cursor 89 exactly as used in a word processor program is implemented on the screen and may be moved by a pointer device, such as a mouse. When an operator moves the cursor to the head of one of the areas of blank lines that represent voice recording, and clicks the mouse button (a well-known process called clicking in the art), the system begins to recite the recorded data. The operator may enter the data at the keyboard as it is recited, and the new text is displayed on the screen as it is entered, replacing the corresponding portion of blanked area. In some embodiments a foot switch is provided to allow an operator to type while at the same time stopping the recitation temporarily, or to slow or speed up the recitation. In other embodiments, simple command voice recognition is used to speed up, slow down, or stop the verbalization so the data entry person can efficiently convert the recorded areas to text. Of course, all of the word processor functions, such as spell checking, thesaurus, etc. may be used to advantage. Once all of the conversion is finished the file is a complete word processor file all in machine-operable text code.

In an embodiment of the conversion application, even though machine-operable text code as entered replaced the graphical representation of voice-recorded data as entry is made, the voice-recorded data is retained as an adjunct to the file so comparison can be made between the entered text and the voice-recorded and edited data at any later time.

PC-Operable Version

Figure 6:
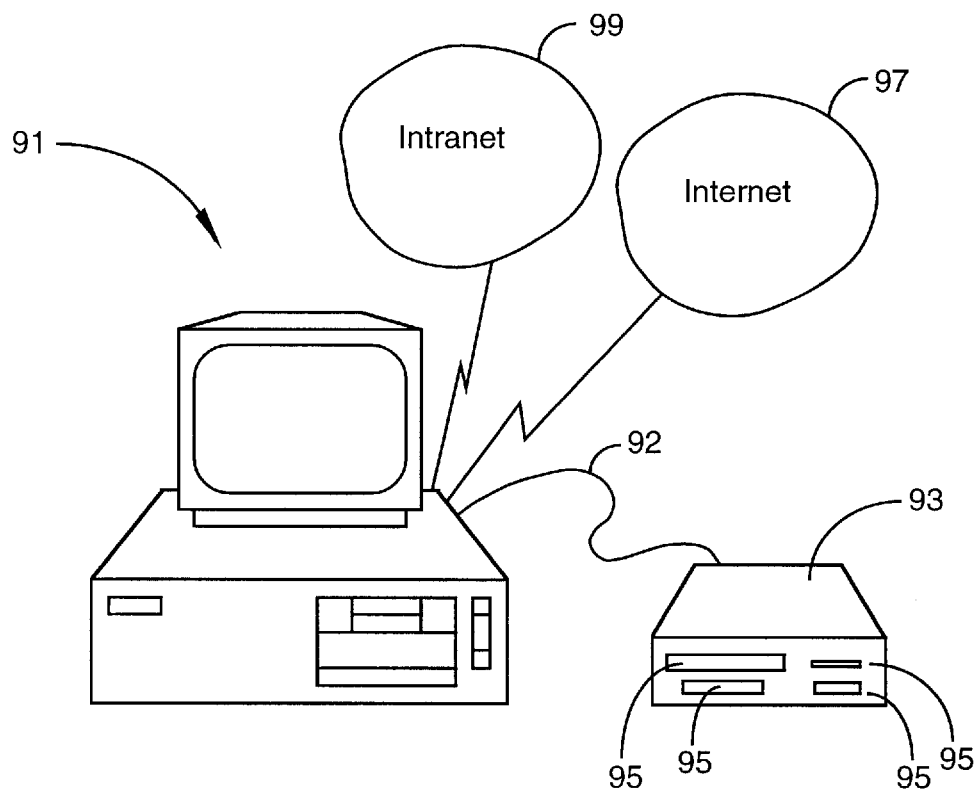
FIG. 6 is a perspective view of a data converter connected to a PC in an embodiment of the present invention.

In an alternative embodiment of the invention, the Audio Editor is implemented as an application executable on a Personal Computer (PC). A PC for this purpose needs a microphone for voice input and a voice-quality speaker for recitation of voice data. In this embodiment, a template file is displayed just as a word processor file as shown in FIG. 6. Functions as described above for an Audio Editor are, in this embodiment, displayed as menu functions across the top of the screen, as is well-known in the art.

A user can move a pointer in the file by positioning the on-screen cursor and clicking at any position. Selecting Record for example, enables voice-activated recording beginning at the pointer position, and a user can enter data which will be stored as digitally-recorded audio data. As such data is entered by voice, the system enters blanked lines, or wavy lines, or some other graphical representation of the existence of voice-recorded data in the pertinent areas.

At any time in the process, a user can move the pointer via the pointer device, and then invoke editing functions to audio edit the voice-recorded data. At the end of such a process a file exists just as the file prepared and edited in Audio Editor 11 described in detail above. That file can be saved, transferred, and the like, and can be loaded and converted at any convenient time to become a finished file all in machine-operable text code.

In an alternative embodiment of the invention the Audio Editor is implemented as enhanced and added functions for an existing word processor, which may be switched to Audio Entry and Editing mode from more conventional modes by a user. In yet another embodiment, voice recognition and automatic conversion is used as much as possible in such a system, and words that the computer does not recognize or that have a significant probability of being incorrect are left blank by the computer and filled in by blanked data graphic. A file in this system may be converted in the same manner as other combination files according to embodiments of the invention. A data entry person clicks on the data graphic and the computer vocalizes the voice recording to be converted. In this embodiment as much as is practical is done by machine.

In PC-operating versions of the system, both dedicated versions and versions implemented as enhancements to existing word processors, all of the familiar high-end word processor functions may be used, such as data importing, drawing integration, text flow, column formatting, and so forth.

Other Applications of the Invention

It was stated above that audio editing would be described as a specific example of the broader invention, and this has been done. It was also stated that the invention has application in the processes of preparing and editing other types of natural data phenomena.

Further applications include, for example, processes of creating and editing natural data of all sorts. Musical scores, vocal and instrumental, as a good example, are recorded in the art in a number of different ways, such as on tape, on vinyl records, on compact disks (CDs), and the like, and also as digitally-recorded natural data. Musical performances are recorded as video natural data in a number of ways, and distributed to the public typically as video tapes. Natural data of other kinds for other purposes is also well-known, such as recorded results of data collection in monitoring use of many kinds of apparatus; auto and truck logs, for example; and photo frames recorded by security apparatus. The present invention has many applications in such cases and circumstances.

FIG. 6 is a perspective view of a desktop-type PC 91 connected by a data link 92 to a conversion device 93. Data link 92 may be any one of several types, such as a standard serial link connected to a PC serial port, or a standard parallel link connected to a PC parallel port, or an enhanced parallel port of which several types are known in the art and known to the inventors.

Device 93 has interfaces 95 for media of one or more sorts, such as CD's, tapes of various sizes, video tapes, and any or all of the media types that may be used in the art for recording natural data. One of the interfaces that might be used in device 93 is a VHS video tape player. In this case, a VHS video tape may be inserted into the player interface, just as in a video player connected to a television, and played.

In the case of a video tape interface, device 93 is adapted to run the tape very rapidly, much more rapidly than typical for presenting a video performance. In some embodiments the natural data stream from the tape, retrieved at an enhanced rate, is recorded in device 93 as an addressable natural data file, in much the manner of digitally-recorded voice, and then transferred (or transferred in parallel as-recorded) over link 92 to PC 91. In other embodiments the retrieved natural data stream is transferred directly via link 92 to PC 91 and recorded therein as digitally-recorded natural data.

Similar processes to those described for video tape are used for natural data retrieved by interfaces 95 from sources of other sorts, such as tapes and CDs. In all cases natural data retrieved goes to digitally-recorded files in PC 91. In some embodiments a microphone is provided, either in device 93 or in PC 91, wherein a user may annotate digitally-recorded natural data stream files as they are converted and transferred.

Device 93 is but one device for retrieving natural data to computer 91. Already recorded natural data files of many sorts may be retrieved as well, for example, from the collection of computer resources known as the Internet, represented in FIG. 6 by entity 97, over data links as are known for connecting computers to the Internet. Such data may also be retrieved from Intranet sources represented by entity 99 via network connections as are known for connecting computers to such networks. Files may also be uploaded by floppy disks, internal and external CD-ROM players, and in many other ways, and prepped in computer 99 to be digitally-recorded natural data files as usable by apparatus and techniques of the present invention.

Natural data editing applications of many sorts may be provided according to the present invention to operate on PC 91. Editing applications are not limited to PCs but may be provided as well for all sorts of computerized workstations. In the case of digitally-recorded natural data video files, for example, a screen graphic similar to that shown in FIG. 5 as element 87 may be provided to represent the data stream. The data stream neutral graphic can also, as described above, be presented in a rich variety of ways, as may best suit individual users who may speak different languages and have different preferences. Any convention of continuing serial phenomena may be used to represent the data stream, and not all of a file is required to be on a screen at one time. The neutral graphic representing a data stream may in typical cases in the invention be scrolled. Page scrolling as well-known in word processing applications is one example. A simple lane across the screen, scrollable to right of left is another example.

Following the example of a video file, one such a file is loaded and represented on the screen, a user may interact with the data stream. A general Play function, for example may be used by placing (via the screen cursor and well-known pointer techniques) a pointer at a position along the data stream, and invoking Play. This function for a video file causes a window for the purpose, which may be resident on the screen to play the video, and audio is played via an on-board or connected speaker or speakers.

Visual on-screen interfaces are provided as are known in the art to adjust the rate at which play functions. In the case of video, one may play quite rapidly, and sound may be processed by DSP techniques to play rapidly as well with minimal distortion. A dragging bar may be provided for jogging purposes, wherein one may rapidly jog to different portions of the data stream.

Other editing functions are provided as described above for audio editing, such as blocking, deleting, copying, dubbing, and the like. Audio annotation may be enabled and accomplished as desired. By retrieving more than one data stream from a digital library, one may select and mix between streams. It will be apparent to those with skill in the art that many other functions may be performed.

In the case of music only, a user may compose musical works by these editing techniques, selecting instruments, rhythms and vocals from a library and superimposing the data streams to produce composite data streams. The techniques may be applied in generally analogous methods to those described, to natural data streams of nearly all known types, providing new and unexpected abilities to deal with natural data.

It will be apparent to those with skill in the art that there are very many alterations that may be made in embodiments described herein without departing from the spirit and scope of the invention. For example, there are many different ways that functions may be called in a hand-held device or in a PC-based application other than the ways that have been described herein. There are similarly many different ways that code may be written for the unique functionality of an Audio Editor or data editor in embodiments of the invention. It is well-known that individual programmers have individual preferences in coding functionality for computers, and that many alternatives may accomplish essentially the same functions. There are many other alternatives as will occur to those with skill in the art. The invention is limited only by the claims listed below.

What is claimed is:

1. A hand-held Audio Editor comprising:

a microcontroller for managing functions;

a microphone port for entering voice;

an electronic memory adapted for storing a file having digitally-recorded voice data;

a speaker port for enunciating stored data as voice;

a pointer system adapted for positioning a pointer at any position in the digitally-recorded voice data by operator input;

a recorder function for storing voice input received through the microphone as digitally-recorded voice data in the file;

a delete function for selecting and deleting digitally-recorded voice data in the file;

an enunciator function adapted for enunciating recorded voice data in the file; and a digital link adapted for two-way transmission of digital data between the hand-held Audio Editor and a host computer;

wherein recorded voice data may be selected and deleted by use of the delete function, new voice data may be inserted into the file via the speaker port and record function at discrete points in the file indicated by the pointer, and wherein placing the pointer at a selected new position in the file causes recorded data of a pre-programmed length to be enunciated beginning at the new pointer position without moving the pointer position in the file, thereby indicating audibly to a user the pointer position in the file.

2. The Audio Editor of claim 1 wherein the audio data enunciated at a new pointer position is enunciated at a rate substantially faster than a rate at which it was recorded.

3. The Audio Editor of claim 1 wherein the pointer system comprises a two-direction input device biased to a neutral position, wherein moving the input device in one direction moves the pointer toward the beginning of a file, and moving the input device in the other direction moves the pointer toward the end of the file.

4. The Audio Editor of claim 3 wherein the pointer moves in the file at a rate which is a function of the degree of deflection of the input device from the neutral position.

5. The Audio Editor of claim 3 wherein the input device is a wheel spring-loaded to the neutral position.

6. The Audio Editor of claim 1 wherein the file comprises machine-operable text code as well as digitally-recorded voice data, the two types of data occupying different regions of the same file.

7. The Audio Editor of claim 1 further comprising an LCD display adapted for displaying information relative to stored files and functions of the Audio Editor.

8. The Audio Editor of claim 1 further comprising a bar graph indicator adapted to display the pointer position relative to the beginning and end of the file.

9. A conversion application operable on a PC comprising:

a display function adapted for displaying a file comprising both machine-operable text code and digitally-recorded voice data as a single serial graphical representation on a video display screen, the text code displayed as text characters and the voice data displayed as a serial graphic in series with the text according to the position of the voice data in the file relative to the text code, the serial graphic representing voice data having an overall length corresponding to the quantity of the voice data;

a cursor function comprising a screen cursor moveable on the screen by input via a pointer device, and adapted to place an editing cursor in the displayed file;

an enunciator function for rendering digitally-recorded voice data as audible voice; and a keyboard for entering machine-operable text code to the file;

wherein placing the editing cursor in one of the voice regions causes the enunciator function to play the voice data as audible speech beginning at the point the editing cursor is placed, and wherein text entered at the keyboard word-for-word corresponding to the enunciated audible speech replaces the serial graphic representing recorded voice, thereby converting the voice data to text data in both the file and the display.

10. The conversion application of claim 9 wherein the voice-recorded data is retained and is later accessible in voice rendition even though text has been entered in the voice region.

11. A dual-nature word processor software application operable on a personal computer (PC) comprising:

a display function adapted for displaying a file having a first region adapted to contain machine-operable text code and a second region adapted to contain digitally recorded voice data, wherein the first region is displayed on a PC screen as text, and the second region is displayed on the PC screen by a non-text serial graphical indication of voice data;

a cursor function adapted to display a cursor on the PC screen, the cursor moveable on the screen by manipulation of a pointer device;

a text entry function adapted for accepting text input and adding said text input to the file; and an audio editing mode;

wherein, in the audio editing mode, the cursor is operable to enable the second region at a selected point to enunciate digitally-recorded voice data beginning at the selected point, and wherein entering text by typing at the keyboard replaces the enunciated voice data both in the file and in the display.

12. The word processor application of claim 11 wherein the replaced digitally-recorded voice data is retained associated with the file in a manner to later be accessed and compared with the text entered to replace the voice data.

13. A word processor comprising:

a personal computer having a display monitor with a display screen;

a microphone port;

a speaker port;

a word processor file loadable and displayable on the display screen, the file having a first region adapted to contain machine-operable text code and a second region adapted to contain digitally recorded voice data;

a display function adapted for displaying the file, wherein the first region is displayed on a PC screen as text, and the second region is displayed on a PC screen by a non-text graphical indication of voice data;

a cursor function adapted to display a cursor on the PC screen, the cursor moveable on the screen by manipulation of a pointer device;

a keyboard input device; and an audio editing mode;

wherein, in the audio editing mode, the cursor is operable to enable the second region at a selected point to enunciate digitally-recorded voice data beginning at the selected point, and wherein entering text by typing at the keyboard replaces the enunciated voice data both in the file and in the display.

14. The word processor of claim 13 wherein the replaced digitally-recorded voice data is retained associated with the file in a manner to later be accessed and compared with the text entered to replace the voice data.

15. A computerized video editor comprising:

a video data stream stored in an addressable digital file, the data stream having a beginning and an end and a natural direction from the beginning to the end;

an interactive serial graphic presentation of the natural data stream on a display, the serial graphic presentation also having a beginning and an end representing the beginning and the end of the natural data stream, and a direction representing the natural direction of the natural data stream;

a selection function for selecting portions of the graphic presentation;

a viewing function associated with a cursor, wherein selected portions of the serial graphic presentation may be displayed in a window in the display; and user-selectable editing functions applicable to the selected portions;

wherein a chosen editing function directed to a selected portion of the graphic presentation of the video data stream causes the editing function to be applied to the stored video data stream, thereby altering the addressable digital file.

16. The video editor of claim 15 further comprising a sound track data stream stored in an addressable digital file and associated with the video data stream, wherein the video data stream and the sound track data stream are represented as separate serial graphic presentations I the display, and wherein portions of the serial graphic presentation representing the sound track may be selected to play the sound track, which may be manipulated with the editing functions separately from portions of the serial graphic representing the video data stream.

17. The video editor of claim 16 wherein the editing functions include one or more of Play, Block, Delete, Copy, Move, Insert and Replace.

18. The video editor of claim 15 wherein the editing functions include one or more of Play, Block, Delete, Copy, Move, Insert and Replace.

* * * * *